(12) United States Patent
Kita et al.

(10) Patent No.: US 11,584,226 B2
(45) Date of Patent: Feb. 21, 2023

(54) ACCELERATOR DEVICE

(71) Applicant: DENSO CORPORATION, Kariya (JP)

(72) Inventors: Takuto Kita, Kariya (JP); Takehiro Saitoh, Kariya (JP); Yasuhiro Otaka, Obu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/399,726

(22) Filed: Aug. 11, 2021

(65) Prior Publication Data
US 2021/0370769 A1  Dec. 2, 2021

Related U.S. Application Data

(63) Continuation of application No. PCT/JP2020/019759, filed on May 19, 2020.

(30) Foreign Application Priority Data

May 21, 2019 (JP) .............................. JP2019-094977

(51) Int. Cl.
*G05G 1/30* (2008.04)
*B60K 26/02* (2006.01)

(52) U.S. Cl.
CPC ...... *B60K 26/021* (2013.01); *B60K 2026/024* (2013.01); *B60K 2026/026* (2013.01)

(58) Field of Classification Search
CPC . G05G 1/30; G05G 1/44; G05G 1/445; B60K 2026/026
See application file for complete search history.

(56) References Cited

U.S. PATENT DOCUMENTS

| 7,717,012 | B2 * | 5/2010 | Kim ...................... B60K 26/02 74/512 |
| 9,323,281 | B2 * | 4/2016 | Byun ...................... G05G 5/03 |
| 9,411,359 | B2 * | 8/2016 | Min ........................ G05G 1/44 |

(Continued)

FOREIGN PATENT DOCUMENTS

| CN | 202782700 | | 3/2013 | |
| DE | 102006035882 | A1 * | 2/2008 | ............... B60T 7/06 |

(Continued)

OTHER PUBLICATIONS

Machine Translation of DE 10 2008 018 140.*

(Continued)

*Primary Examiner* — Brian J McGovern
(74) *Attorney, Agent, or Firm* — Nixon & Vanderhye P.C.

(57) ABSTRACT

An accelerator device includes a pad configured to receive an input force from a driver, a case attachable to a vehicle body and having a front wall facing the pad, and an internal movable mechanism housed in the case. The internal movable mechanism includes a shaft that is rotatably supported in the case and a pedal extending outward from an outer peripheral portion of the shaft. An arm is arranged to pass through an opening provided in the front wall and to connect the pad and the pedal, and a cushioning member is provided in the front wall, to be inserted between the pedal or the arm and the front wall in an accelerator fully-closed state, and to be inserted between the pad and the front wall in an accelerator fully-open state.

12 Claims, 6 Drawing Sheets

(56) References Cited

U.S. PATENT DOCUMENTS

| | | | | |
|---|---|---|---|---|
| 2010/0139445 A1* | 6/2010 | Kim | ............ | G05G 1/38 74/514 |
| 2014/0366677 A1* | 12/2014 | Kim | ............ | G05G 1/44 74/512 |
| 2018/0105038 A1* | 4/2018 | Viethen | ............ | B60K 26/021 |
| 2019/0163227 A1* | 5/2019 | Kadoi | ............ | G05G 5/03 |

FOREIGN PATENT DOCUMENTS

| | | | | | |
|---|---|---|---|---|---|
| DE | 102008018140 A1 | * | 10/2009 | ............ | B60K 26/02 |
| DE | 102009032664 A1 | * | 1/2011 | ............ | G05G 1/44 |
| DE | 102014213852 A1 | * | 1/2016 | ............ | B60K 26/02 |
| DE | 102019128486 A1 | * | 4/2021 | ............ | B60K 26/02 |
| JP | 2020100175 A | * | 7/2020 | ............ | G05G 1/44 |
| JP | 2020189534 A | * | 3/2021 | ............ | B60K 26/02 |
| JP | 2021035791 A | * | 3/2021 | ............ | B60K 26/02 |
| JP | 2021046053 A | * | 3/2021 | ............ | B60K 26/02 |
| WO | WO-2020129377 A1 | * | 6/2020 | ............ | B60K 26/02 |
| WO | WO-2020129388 A1 | * | 6/2020 | ............ | B60K 26/02 |

OTHER PUBLICATIONS

Machine Translation of DE 10 2009 032 664.*
Machine Translation of JP 2020/100175.*
Machine Translation of DE 10 2006 035 882.*
Machine Translation of DE 10 2014 213 852.*
Machine Translation of DE 10 2019 128 486.*
Machine Translation of JP 2021-035791.*
Machine Translation of JP-2021046053.*
Machine Translation of JP-2020189534.*
Machine Translation of WO-2020129388.*
Machine Translation of WO-2020129377.*

* cited by examiner

ACCELERATOR DEVICE

CROSS REFERENCE TO RELATED APPLICATION

The present application is a continuation application of International Patent Application No. PCT/JP2020/019759 filed on May 19, 2020, which designated the U.S. and claims the benefit of priority from Japanese Patent Application No. 2019-094977 filed on May 21, 2019. The entire disclosures of all of the above applications are incorporated herein by reference.

TECHNICAL FIELD

The present disclosure relates to an accelerator device.

BACKGROUND

An accelerator device includes a case attachable to a vehicle body and a stepping member that is connected to the case. In the accelerator device, an accelerator opening degree is adjusted according to a driver's stepping on the stepping member.

SUMMARY

According to an aspect of the present disclosure, an accelerator device is provided. Because a cushioning member is used not only as a buffer for a collision in an accelerator fully-closed state but also as a buffer for a collision in an accelerator fully-open state, the number of parts in the accelerator device can be reduced. Furthermore, collision between parts, which occurs any in the accelerator fully-closed state or in the accelerator fully-open state, can be buffered by the cushioning member.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENT

An accelerator device includes a cushioning member that buffers a collision between parts caused when the stepping member returns to a fully closed state of the accelerator. In the accelerator device, the cushioning member is not for buffering a collision between the parts caused when the stepping member becomes in a fully open state of the accelerator. Therefore, in the accelerator device, there is a demand for a technology that can buffer the collision between the parts caused when the accelerator becomes in the fully open state in addition to buffering of the collision between the parts caused when the accelerator becomes in a fully close state.

According to an aspect of the present disclosure, an accelerator device includes a pad configured to receive an input force from a driver, a case attachable to a vehicle body and having a front wall facing the pad, an internal movable mechanism housed in the case, an arm arranged to pass through an opening provided in the front wall and to connect the pad and a pedal, and a cushioning member provided in the front wall. The internal movable mechanism includes a shaft that is rotatably supported in the case and the pedal extending outward from an outer peripheral portion of the shaft. The arm is arranged to pass through an opening provided in the front wall and to connect the pad and the pedal. The cushioning member is provided in the front wall to be inserted between the pedal or the arm and the front wall in an accelerator fully-closed state, and to be inserted between the pad and the front wall in an accelerator fully-open state. According to the accelerator device, collision between parts, which occurs any in the accelerator fully-closed state or in the accelerator fully-open state, can be buffered by the cushioning member. Because the cushioning member is used not only as a buffer for a collision in the accelerator fully-closed state but also as a buffer for a collision in the accelerator fully-open state, the number of parts in the accelerator device can be reduced as compared with a case in which a separate cushioning member is provided for each collision.

According to another aspect of the present disclosure, an accelerator device includes a pad configured to receive an input force from a driver, a case attachable to a vehicle body and having a front wall facing the pad, an internal movable mechanism housed in the case and including a shaft that is rotatably supported in the case and a pedal extending outward from an outer peripheral portion of the shaft, an arm arranged to pass through an opening provided in the front wall and to connect the pad and the pedal, a receiving portion provided in the case to receive the pedal in an accelerator fully-open state, and a cushioning member provided in the pedal to be inserted between the pedal and the front wall in an accelerator fully-closed state, and to be inserted between the pedal and the receiving portion in an accelerator fully-open state. Thus, collision between parts, which occurs any in the accelerator fully-closed state or in the accelerator fully-open state, can be buffered by the cushioning member.

The aspects of the present disclosure can also be realized in various devices other than the above accelerator device. For example, the aspects of the present disclosure can be realized in an engine system including an accelerator device, a vehicle equipped with an accelerator device, or the like.

Hereinafter, detail embodiments of the present disclosure will be described with reference to the drawings.

A. First Embodiment

Figure 1:
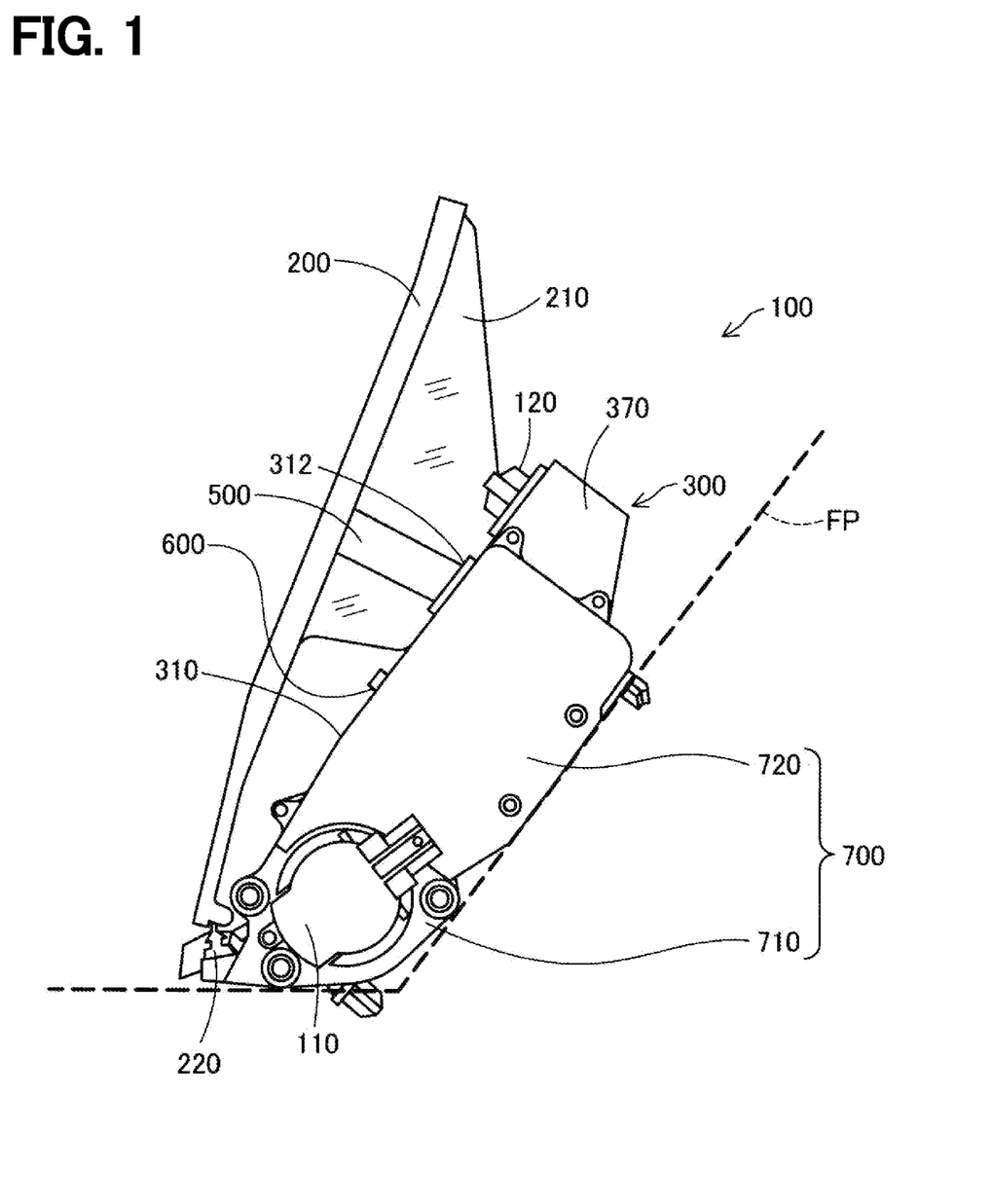
FIG. 1 is a diagram for explaining a configuration of an accelerator device.

As shown in FIG. 1, an accelerator device 100 is configured to be attachable to a floor panel FP that constitutes a part of a vehicle body in a vehicle. Unless otherwise specified, the description of the structure and arrangement of the accelerator device 100 described below means the structure and arrangement in an installed state in which the accelerator device 100 is installed on the vehicle body. For example, the terms "upward" and "upper side" mean upward and upper side in the installed state in which the accelerator device 100 is installed on the vehicle body. The same applies to other terms and explanations.

Figure 2:
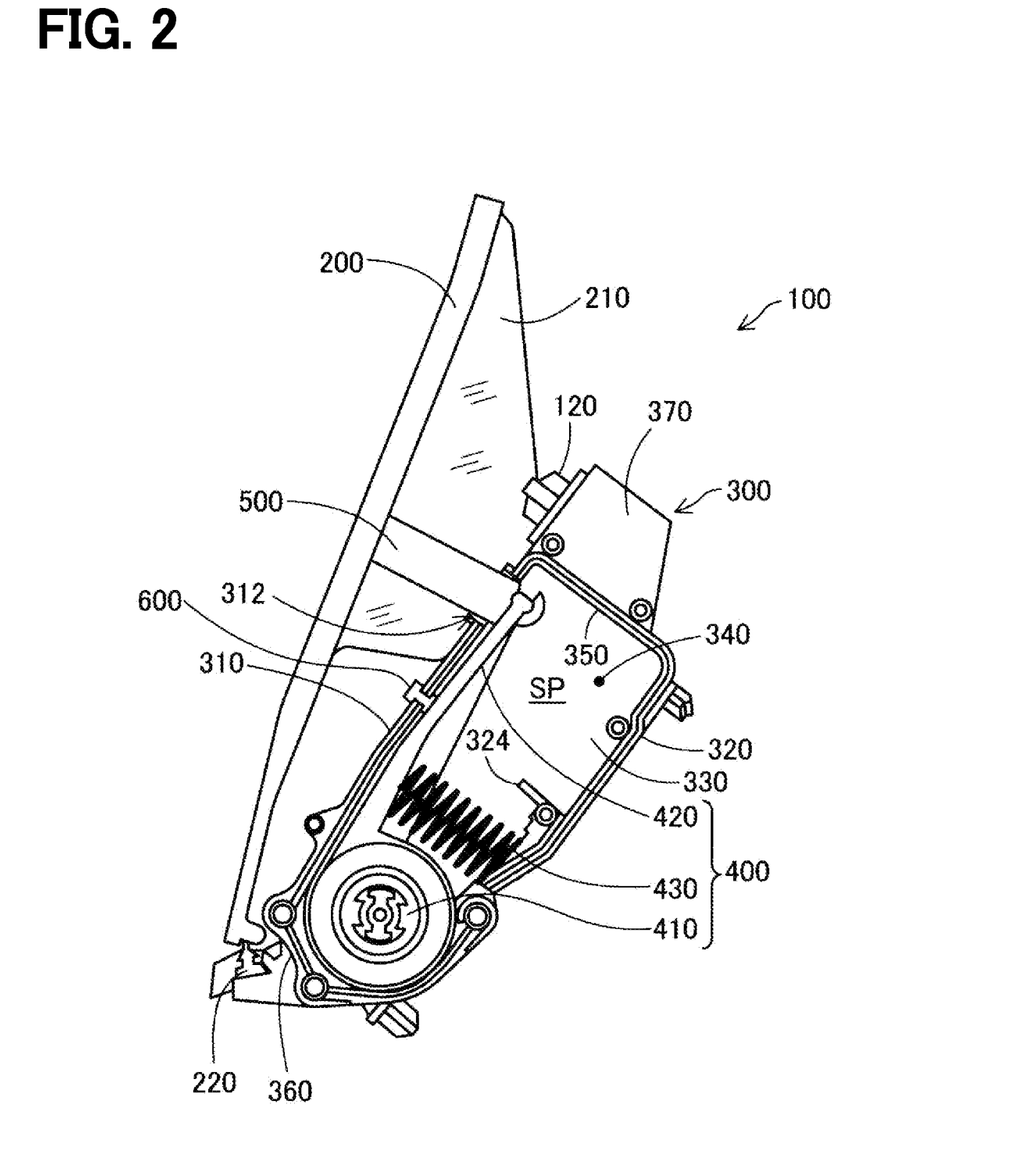
FIG. 2 is a diagram showing an accelerator device in a fully closed state of an accelerator.

The accelerator device 100 includes a pad 200 configured to receive a stepping by a driver, a case 300 attachable to a vehicle body, an internal movable mechanism 400 housed in the case 300 as shown in FIG. 2, and an arm 500 configured to connect the pad 200 and the internal movable mechanism 400 while penetrating through an opening 312 provided in an outer wall surface of the case 300. The opening 312 can also be referred to as a "through hole 312". As described above, the accelerator device 100 having a structure in which the pad 200 provided on the driver side of the case 300 and the internal movable mechanism 400 housed in the case 300 are connected by the arm 500 is called an "organ structure type" accelerator device.

The pad 200 is configured to be stepped on by the driver. The speed of the vehicle is adjusted according to a stepping degree of the driver with respect to the pad 200. In other words, the stepping degree is a ratio (%) of an operation range to the total movable range of the pad 200, and can be called as an accelerator opening. A plate-shaped side guard portion 210 is provided on the side surface of the pad 200. A lower end of the pad 200 is supported by a fulcrum member 220 provided at a lower end of the case 300, and the pad 200 is rotatable about a contact point with the fulcrum member 220. The side guard portion 210 is a member that guards a gap between the pad 200 and the case 300 so that the driver's foot is not pressed between the pad 200 and the case 300.

Figure 3:
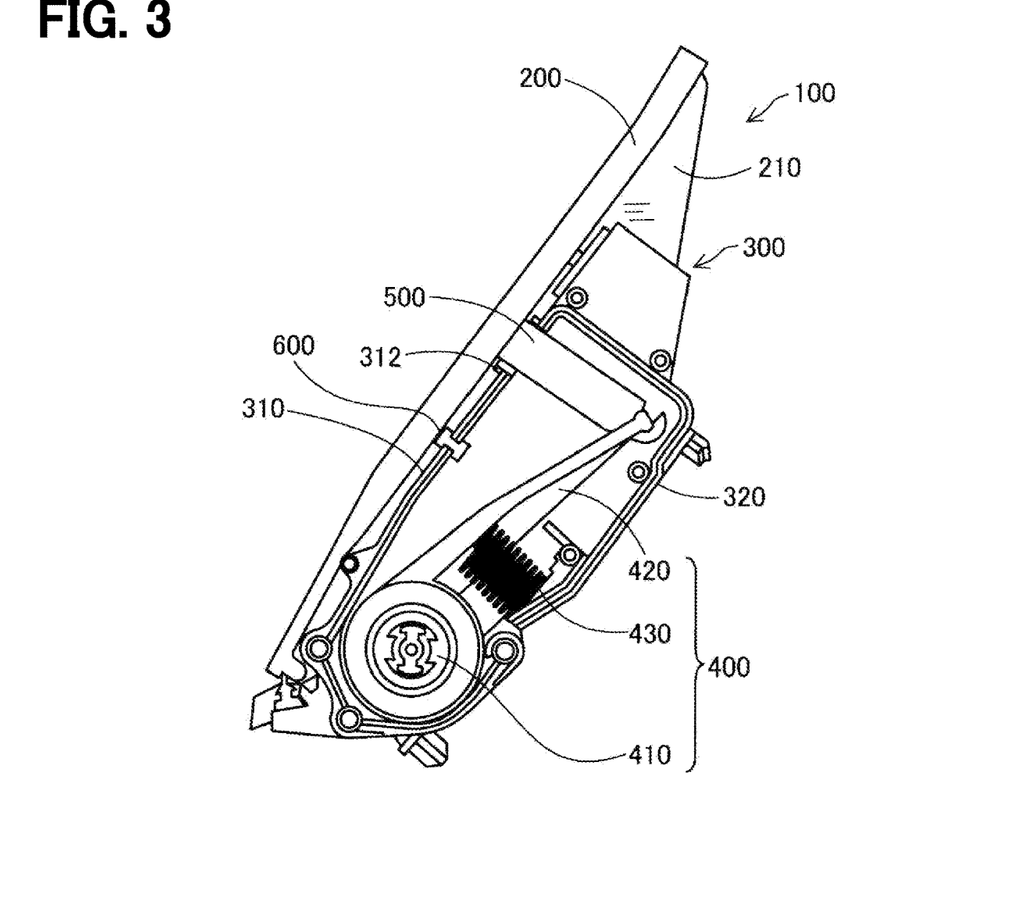
FIG. 3 is a diagram showing an accelerator device in a fully open state of the accelerator.

FIGS. 2 and 3 show the accelerator device 100 in a state where a cover 700 is removed. As shown in FIG. 2, the case 300 is an accommodation wall surrounding an internal accommodation space SP, and includes a front wall 310 facing the pad 200, a back wall 320 facing the front wall 310, an open side surface 330 forming one side surface between the front wall 310 and the back wall 320, a side wall 340 facing the open side surface 330, an upper surface wall 350 defining an upper end of the internal accommodation space SP, and a lower surface wall 360 facing the upper surface wall 350. Strictly speaking, since the open side surface 330 is not a wall surface, the walls 310, 320, 340 to 360 other than the open side surface 330 function as accommodation walls surrounding the internal accommodation space SP. As shown in FIG. 1, the open side surface 330 is covered and closed by a cover 700 made of a first cover portion 710 and a second cover portion 720. In the present embodiment, the first cover portion 710 and the second cover portion 720 are configured as separate bodies, but they may be configured as a single member.

The front wall 310 is provided with an opening 312 through which the arm 500 passes. A kickdown switch 120 is installed on the outer wall surface of the case 300 above the opening 312. The kickdown switch 120 is a switch for detecting "kickdown", which is an operation in which the driver shifts down the gear at once by strongly depressing the pad 200. A storage chamber 370 for accommodating the kickdown switch 120 is formed at an uppermost portion of the case 300.

As shown in FIG. 2, a plate-shaped wall portion 324 extending diagonally upward from the back wall 320 toward the front wall 310 is provided on an inner surface of the back wall 320 of the case 300. The wall portion 324 guides water to a path avoiding an installation position of an urging member 430 so that the water entering from the opening 312 of the case 300 does not directly reach the urging member 430 when it falls in the vertical direction.

As shown in FIG. 2, the internal movable mechanism 400 includes a shaft 410 rotatably supported by the case 300, a pedal 420 extending diagonally upward from the outer peripheral portion of the shaft 410, and the urging member 430 that is housed below the pedal 420 and applies force to the pedal in the direction in which the accelerator is in a fully closed state. The fully closed state of the accelerator will be described later. As shown in FIG. 1, the first cover portion 710 covers a lower portion of the open side surface 330 of the case 300, which corresponds to the side surface portion of the shaft 410. The second cover portion 720 covers an upper portion of the open side surface 330 above the first cover portion 710.

As shown in FIG. 1, an accelerator opening sensor 110 that generates an accelerator opening signal according to a rotation angle of the shaft 410 is provided on the outside of the shaft 410. In the present embodiment, the accelerator opening sensor 110 includes a detection circuit including a Hall element that detects an orientation of a permanent magnet embedded in the shaft 410. However, it is also possible to use various types of accelerator opening sensors other than the above-described sensor.

The pedal 420 of the internal movable mechanism 400 is connected to the pad 200 via the arm 500. The force input from the driver and received by the pad 200 is transmitted to the pedal 420 via the arm 500. In accordance with the force degree transmitted, the pedal 420 moves toward the back wall 320 while rotating the shaft 410.

As shown in FIGS. 2 and 3, the urging member 430 is disposed below the pedal 420. In the present embodiment, the urging member 430 is a string-wound spring, but an urging member having another configuration can also be used.

In the constituent elements of the accelerator device 100, the elements other than the shaft 410 and the urging member 430 can be formed of resin. The overall configuration of the accelerator device 100 described above is an example, and a part thereof can be arbitrarily omitted or modified. For example, the side guard portion 210 or/and the wall portion 324 may be omitted.

Hear, the fully closed state of the accelerator is a state in which the stepping amount of the driver with respect to the pad 200 is zero. On the other hand, the fully open state of the accelerator is a state in which the stepping amount of the driver with respect to the pad 200 is the limit within the movable range of the pad 200. In other words, the fully closed state of the accelerator is a state in which the accelerator opening degree is 0%, and the fully open state of the accelerator is a state in which the accelerator opening degree is 100%.

FIG. 2 shows the accelerator device 100 in the fully closed state of the accelerator. FIG. 3 shows the accelerator device 100 in the fully open state of the accelerator. In the fully closed state of the accelerator, when the pad 200 receives an input force from the driver, the accelerator device 100 shifts from the state shown in FIG. 2 toward the state shown in FIG. 3.

The front wall 310 has a cushioning member 600 (i.e., buffer member). The cushioning member 600 is provided in the front wall 310 at a position downward from the opening 312. The cushioning member 600 has a shape that penetrates through the front wall 310, and is provided with a cushion part arranged at one surface of the front wall 310 facing the pad 200 and a cushion part arranged at the other surface of the front wall 310 facing the internal accommodation space SP.

The cushion part of the cushioning member 600 arranged on the side of the front wall 310 facing the internal accommodation space SP is sandwiched between the pedal 420 and the front wall 310 when the accelerator device 100 is in the fully closed state of the accelerator shown in FIG. 2. Therefore, the cushioning member 600 can buffer the collision between the pedal 420 and the front wall 310 when the accelerator device 100 is in the fully closed state of the accelerator.

The cushion part of the cushioning member 600 arranged on the side of the front wall 310 facing the pad 200 is sandwiched between the pad 200 and the front wall 310 when the accelerator device 100 is in the fully open state of the accelerator shown in FIG. 3. Therefore, the cushioning member 600 can buffer the collision between the pad 200 and the front wall 310 when the accelerator device 100 is in the fully open state of the accelerator.

Figure 4:
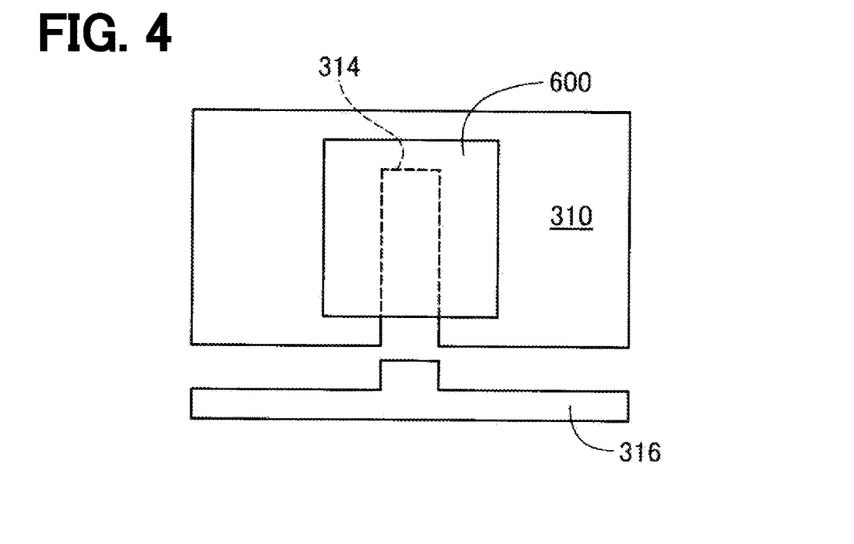
FIG. 4 is a view showing a state of a front wall when being viewed from a side of a wall surface facing the pad.

The assembly of the cushioning member 600 with respect to the front wall 310 will be described with reference to FIG. 4. FIG. 4 shows a state when the front wall 310 is viewed from a surface side of the front wall 310 facing the pad 200. A member for the front wall 310 has a recess 314 and a protruding member 316. The recess 314 is recessed in a plane direction along the surface of the front wall 310. The portion of the recess 314 indicated by the broken line is a portion hidden by the cushioning member 600. The cushioning member 600 is inserted into the recess 314 from the plane direction and fits into the recess 314. The protruding member 316 is a member that fits into the recess 314 in which the cushioning member 600 is fitted. The protruding member 316 illustrated in FIG. 4 is in a state before being fitted into the recess 314. In the present embodiment, since the cushioning member 600 is assembled to the front wall 310 by fitting into the recess 314, the assembling work can be made simple. Further, because the protruding member 316 is fitted into the recess 314 so that no gap is formed around the cushioning member 600, it is possible to prevent foreign matter from entering the inside of the case 300 from the outside.

According to the first embodiment described above, the collision between parts, which occurs when the accelerator is fully closed (shown in FIG. 2) or when the accelerator is fully open (shown in FIG. 3), can be buffered by the cushioning member 600. Further, because the cushioning member 600 is used not only as a buffer for a collision when the accelerator is fully closed but also a buffer for a collision when the accelerator is fully opened, the number of parts in the accelerator device 100 can be reduced as compared with a case in which a separate cushioning member is provided for each collision.

B. Second Embodiment

Figure 5:
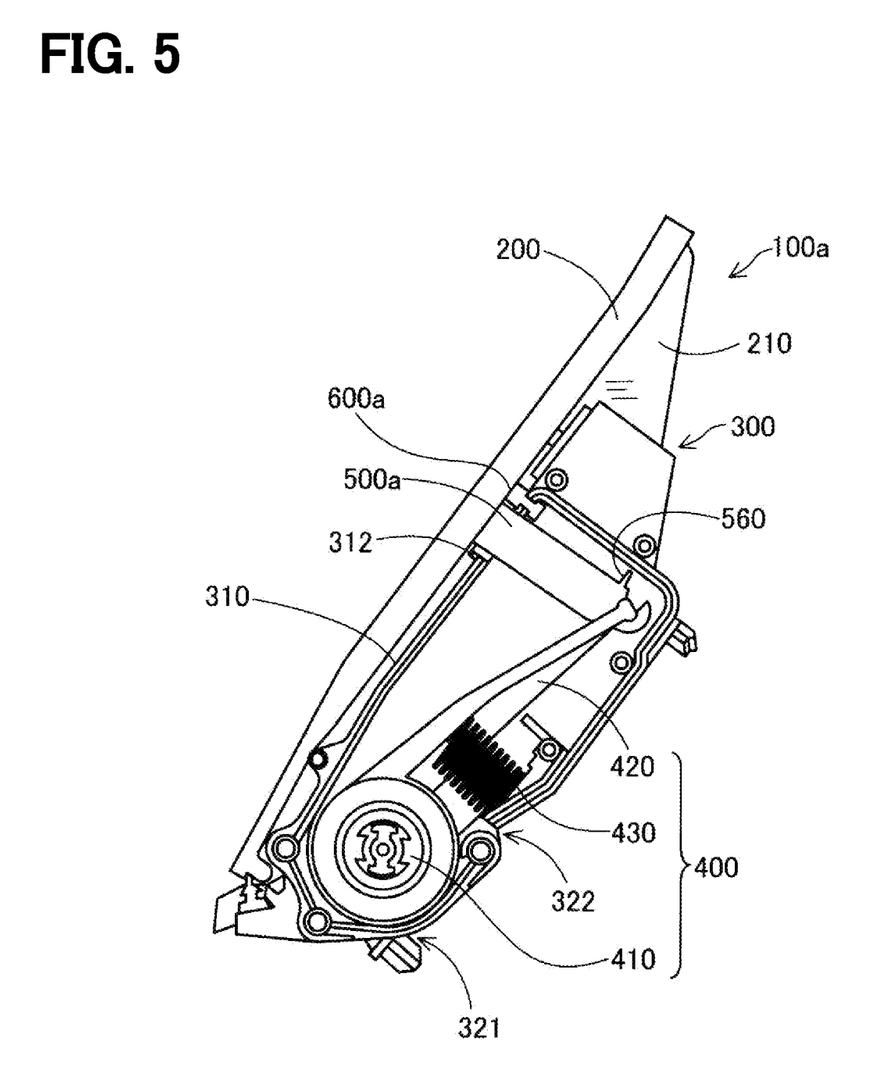
FIG. 5 is a diagram for explaining a configuration of an accelerator device.

FIG. 5 shows an accelerator device 100a of the second embodiment. The accelerator device 100a of the second embodiment shown in FIG. 5 includes an arm 500a and a cushioning member 600a that are different from the arm 500 and the cushioning member 600 of the first embodiment, as compared with the accelerator device 100 of the first embodiment. The other parts of the accelerator device 100a except for the arm 500a and the cushioning member 600a are the same as the accelerator device 100 of the first embodiment. The same reference signs as in the first embodiment denote the same or substantially equal structural components, and the description of the first embodiment regarding the same reference signs are incorporated by reference.

FIG. 5 shows the accelerator device 100a in the fully open state of the accelerator. The cushioning member 600a is provided at a position adjacent to the opening 312 in the front wall 310. The arm 500a has a protruding portion 560. The protruding portion 560 projects outward from an outer peripheral surface of the arm 500a. When the accelerator device 100a shifts from the fully open state of the accelerator to the fully close state of the accelerator, the protruding member 560 is configured to become into contact with the cushioning member 600a.

A cushion part of the cushioning member 600a facing the pad 200 is sandwiched between the pad 200 and the front wall 310 when the accelerator device 100a is in the fully open state of the accelerator shown in FIG. 5. Therefore, the cushioning member 600a can buffer the collision between the pad 200 and the front wall 310 when the accelerator device 100a is in the fully open state of the accelerator.

The cushion part of the cushioning member 600a facing the internal accommodation space SP is sandwiched between the protruding member 560 and the front wall 310 when the accelerator device 100a is in the fully closed state of the accelerator. Therefore, the cushioning member 600a can buffer the collision between the pedal 420 and the front wall 310 when the accelerator device 100a is in the fully closed state of the accelerator. Therefore, according to the second embodiment, the same effects as in the first embodiment can be obtained.

C. Third Embodiment

Figure 6:
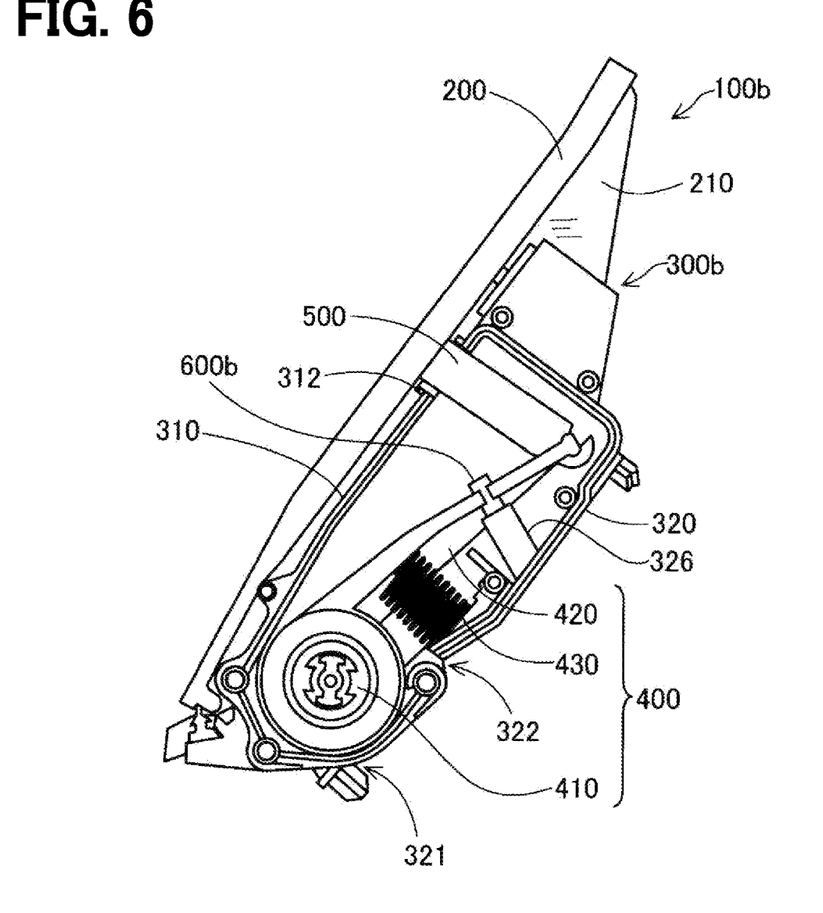
FIG. 6 is a diagram for explaining a configuration of an accelerator device.

FIG. 6 shows an accelerator device 100b of the third embodiment. The accelerator device 100b of the third embodiment shown in FIG. 6 includes a case 300b and a cushioning member 600b that are different from the case 300 and the cushioning member 600 of the first embodiment, as compared with the accelerator device 100 of the first embodiment. The other parts of the accelerator device 100b except for the case 300b and the cushioning member 600b are the same as the accelerator device 100 of the first embodiment. The same reference signs as in the first embodiment denote the same or substantially equal structural components, and the description of the first embodiment regarding the same reference signs are incorporated by reference.

FIG. 6 shows the accelerator device 100b in the fully open state of the accelerator. The cushioning member 600b is provided in a portion of the pedal 420 above the position where the pedal 420 comes into contact with the urging member 430. The case 300b has a receiving portion 326. The receiving portion 326 projects from the back wall 320 toward the front wall 310. When the accelerator device 100b shifts from the fully closed state of the accelerator to the fully open state of the accelerator, the receiving portion 326 receives the pedal 420. More specifically, because the receiving portion 326 is configured to be in contact with the cushioning member 600b, the receiving portion 326 receives the pedal 420 via the cushioning member 600b.

The cushioning member 600b is inserted between the pedal 420 and the receiving portion 326 of the case 300 when the accelerator device 100b is in the fully open state of the accelerator. Therefore, the cushioning member 600b can buffer the collision between the pedal 420 and the receiving portion 326 when the accelerator device 100b is in the fully open state of the accelerator.

The cushioning member 600b is inserted between the pedal 420 and the front wall 310 when the accelerator device 100b is in the fully closed state of the accelerator. Therefore, the cushioning member 600b can buffer the collision between the pedal 420 and the front wall 310 when the accelerator device 100a is in the fully closed state of the accelerator. Thus, according to the third embodiment, the same effects as in the first or second embodiment can be obtained.

D. Other Embodiments

In the first embodiment described above, the cushioning member 600 is arranged at the front wall 310 via the recess 314 and the protruding member 316 as described in FIG. 4, but the present disclosure is not limited to this. For example, the cushioning member 600 may be arranged at the front wall 310 by another configuration.

Figure 7:
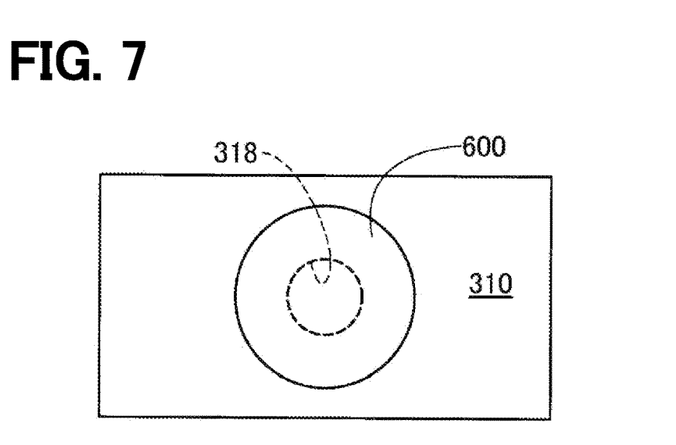
FIG. 7 is a view showing a state of a front wall when being viewed from a side of a wall surface facing the pad.

FIG. 7 shows a cushioning member 600 arranged on the front wall 310 by another configuration. FIG. 7 shows a state when the front wall 310 is viewed from a surface side of the front wall 310 facing the pad 200, similarly to FIG. 4.

Figure 8:
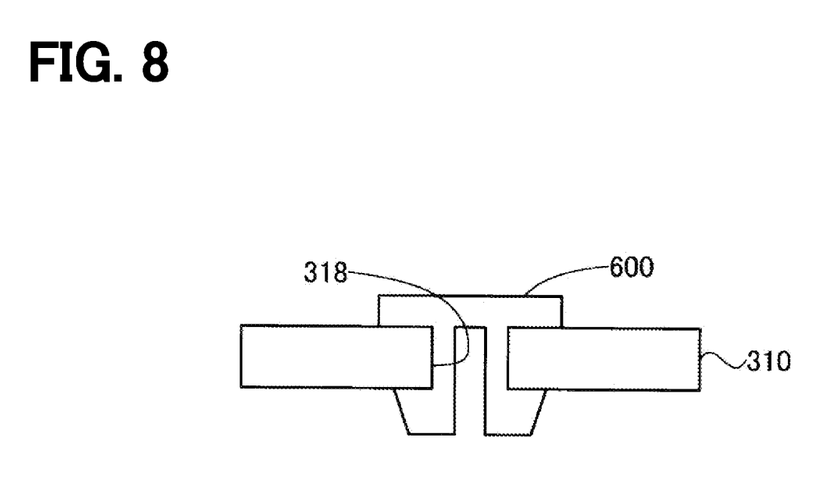
FIG. 8 is a view showing a state of a front wall when the front wall is viewed from a plane direction.

The front wall 310 illustrated in FIG. 7 has a through hole 318. The through hole 318 penetrates through the front wall 310. In FIG. 7, the through hole 318 is hidden by the cushioning member 600 and is shown by a broken line. FIG. 8 shows a state when the front wall 310 is viewed from a plane direction along the surface of the front wall 310. The cushioning member 600 is inserted into the through hole 318 and arranged in the front wall 310. As shown in FIG. 8, the cushioning member 600 may be configured so as to easily pass through the through hole 318.

An insert molding may be used as another configuration for arranging the cushioning member 600 at a position of the front wall 310. Specifically, the cushioning member 600 is formed by insert molding with respect to the front wall 310 having the through hole 318. In this case, the airtightness between the cushioning member 600 and the front wall 310 is enhanced, and it is possible to prevent foreign matter from entering the case 300 from the outside.

As the arrangement of the cushioning member 600, the arrangement via the recess 314 and the protruding member 316, the arrangement by inserting the cushioning member into the through hole 318, the arrangement by insert molding into the through hole 318, and the like are mentioned. These arrangements described above may be suitably applied to the second embodiment or the third embodiment.

The present disclosure should not be limited to the embodiments or modifications described above, and various other embodiments may be implemented without departing from the scope of the present disclosure. For example, the technical features in each embodiment corresponding to the technical features in the form described in the summary may be used to solve some or all of the above-described problems, or to provide one of the above-described effects. In order to achieve a part or all, replacement or combination can be appropriately performed. Also, if the technical features are not described as essential in the present specification, they can be deleted as appropriate.

What is claimed is:

1. An accelerator device comprising:
a pad configured to receive an input force from a driver;
a case attachable to a vehicle body and having a front wall facing the pad;
an internal movable mechanism housed in the case, and including a shaft that is rotatably supported in the case and a pedal extending outward from an outer peripheral portion of the shaft;
an arm arranged to pass through an opening provided in the front wall and to connect the pad and the pedal; and
a cushioning member provided at a single position of the front wall, wherein the cushioning member is inserted between the pedal or the arm and the front wall in an accelerator fully-closed state, and is inserted between the pad and the front wall in an accelerator fully-opened state,
wherein the cushioning member penetrates through the front wall and includes a first cushion part arranged at one surface of the front wall facing the pad and a second cushion part arranged at another surface of the front wall,
wherein the first cushion part of the cushioning member is configured to directly contact the pad in the accelerator fully-opened state, and the second cushion part of the cushioning member is configured to directly contact the pedal or the arm in the accelerator fully-closed state,
wherein the pad has a first end and a second end, the second end is opposite to the first end in the longitudinal direction of the pad, and the first end is closer to the shaft than the second end,
wherein the cushioning member in the accelerator fully-opened state is positioned between the second end and a center of the pad in the longitudinal direction,
wherein the front wall has a recess recessed in a plane direction along a surface of the front wall, and the cushioning member is inserted from the plane direction and fitted into the recess, and
wherein the front wall includes a protruding member configured to fit into the recess in which the cushioning member is fitted.

2. An accelerator device comprising:
a pad configured to receive an input force from a driver;
a case attachable to a vehicle body and having a front wall facing the pad;
an internal movable mechanism housed in the case, and including a shaft that is rotatably supported in the case and a pedal extending outward from an outer peripheral portion of the shaft;
an arm arranged to pass through an opening provided in the front wall and to connect the pad and the pedal; and
a receiving portion provided in the case to receive the pedal in an accelerator fully-opened state; and
a cushioning member provided at a single position of the pedal, wherein the cushioning member is inserted between the pedal and the front wall in an accelerator fully-closed state, and is inserted between the pedal and the receiving portion in an accelerator fully-opened state,
wherein the cushioning member penetrates through the pedal and includes a first cushion part arranged at one surface of the pedal facing the front wall and a second cushion part arranged at another surface of the pedal,
wherein the second cushion part of the cushioning member is configured to directly contact the receiving portion in the accelerator fully-opened state, and the first cushion part of the cushioning member is configured to directly contact the front wall in the accelerator fully-closed state, wherein the pedal has a first end and a second end, second end is opposite to the first end in a longitudinal direction of the pedal, and the first end is closer to the shaft than the second end, and wherein the cushioning member in the accelerator fully-opened state is positioned between the second end and a center of the pedal in the longitudinal direction.

3. The accelerator device according to claim 2, wherein the pedal has a recess in a plane direction along a surface of the pedal, and the cushioning member is inserted from the plane direction and fitted into the recess.

4. The accelerator device according to claim 3, wherein the pedal includes a protruding member configured to fit into the recess in which the cushioning member is fitted.

5. The accelerator device according to claim 2, wherein the pedal has a through hole penetrating through the pedal, and the cushioning member is disposed in the pedal to be inserted into the through hole.

6. The accelerator device according to claim 2, wherein the pedal has a through hole penetrating through the pedal, and the cushioning member is disposed in the pedal by insert-molding into the through hole.

7. The accelerator device according to claim 2, wherein the cushioning member is movable along with movement of the pedal upon receipt of the input force from the driver on the pad.

8. An accelerator device comprising:

a pad configured to receive an input force from a driver;

a case attachable to a vehicle body and having a front wall facing the pad;

an internal movable mechanism housed in the case, and including a shaft that is rotatably supported in the case and a pedal extending outward from an outer peripheral portion of the shaft;

an arm arranged to pass through an opening provided in the front wall and to connect the pad and the pedal; and a cushioning member provided in the front wall, to be inserted between the pedal or the arm and the front wall in an accelerator fully-closed state, and to be inserted between the pad and the front wall in an accelerator fully-opened state; wherein:

the front wall has a recess recessed in a plane direction along a surface of the front wall, the cushioning member is inserted from the plane direction and fitted into the recess, and the front wall includes a protruding member configured to fit into the recess in which the cushioning member is fitted.

9. The accelerator device according to claim 8, wherein the cushioning member is positioned adjacent to the arm.

10. The accelerator device according to claim 9, wherein the arm has a protruding portion protruding outward from an outer peripheral surface of the arm, and the cushioning member directly contacts the protruding portion in the accelerator fully-closed state.

11. The accelerator device according to claim 8, wherein the cushioning member is inserted between the pedal and the front wall in an accelerator fully-closed state.

12. An accelerator device comprising:

a pad configured to receive an input force from a driver;

a case attachable to a vehicle body and having a front wall facing the pad;

an internal movable mechanism housed in the case, and including a shaft that is rotatably supported in the case and a pedal extending outward from an outer peripheral portion of the shaft;

an arm arranged to pass through an opening provided in the front wall and to connect the pad and the pedal; and a receiving portion provided in the case to receive the pedal in an accelerator fully-opened state; and a cushioning member provided in the pedal, to be inserted between the pedal and the front wall in an accelerator fully-closed state, and to be inserted between the pedal and the receiving portion in an accelerator fully-opened state, wherein:

the pedal has a recess in a plane direction along a surface of the pedal, the cushioning member is inserted from the plane direction and fitted into the recess, and the pedal includes a protruding member configured to fit into the recess in which the cushioning member is fitted.

* * * * *